United States Patent [19]

Falzoni

[11] 4,353,270

[45] Oct. 12, 1982

[54] DRIVE TRANSMISSION UNIT INCORPORATING EXPANSIBLE-PULLEY STEPLESS SPEED CHANGER

[75] Inventor: Gianluigi Falzoni, Turin, Italy

[73] Assignee: Fiat Auto S.p.A., Turin, Italy

[21] Appl. No.: 125,383

[22] Filed: Feb. 28, 1980

[30] Foreign Application Priority Data

Apr. 11, 1979 [IT] Italy ................ 67764 A/79

[51] Int. Cl.³ .................... F16H 37/00; F16H 37/08
[52] U.S. Cl. ...................................... 74/689; 74/695;
74/701; 74/714; 74/740
[58] Field of Search ............... 74/701, 705, 695, 694,
74/682, 689, 760, 761, 710, 714

[56] References Cited

U.S. PATENT DOCUMENTS

| | | | |
|---|---|---|---|
| 687,173 | 11/1901 | Upton | 74/695 |
| 798,746 | 9/1905 | Normanville | 74/695 |
| 2,932,216 | 4/1960 | Schou | 74/689 |
| 3,090,256 | 5/1963 | Hause | 74/695 X |
| 3,375,738 | 4/1968 | Love | 74/740 |
| 3,411,382 | 11/1968 | Mori | 74/701 X |
| 3,492,890 | 2/1970 | Hill et al. | 74/714 |
| 4,056,988 | 11/1977 | Kubo et al. | 74/695 |
| 4,060,012 | 11/1977 | Giacosa | 74/689 |
| 4,077,282 | 3/1978 | Kress | 74/760 |
| 4,228,697 | 10/1980 | Miller | 74/760 X |

FOREIGN PATENT DOCUMENTS

| | | | |
|---|---|---|---|
| 695367 | 8/1940 | Fed. Rep. of Germany | 74/760 |
| 1070845 | 8/1954 | France | 74/682 |
| 1297673 | 11/1972 | United Kingdom | 74/695 |

*Primary Examiner*—Leslie Braun
*Attorney, Agent, or Firm*—Sughrue, Mion, Zinn, Macpeak and Seas

[57] ABSTRACT

A drive transmission unit for a motor vehicle incorporates an expansible-pulley stepless speed changer arranged to drive a differential unit via a reduction gear box and a selectively-operable reversing unit. The speed changer has a primary shaft which serves as the input shaft of the transmission unit, and a hollow secondary shaft parallel to, and driven from, the primary shaft. The reversing unit, reduction gear box and differential unit are all epicyclic in form and are arranged in that order side-by-side coaxial with the secondary shaft. Two output shafts connect the differential unit to the half shafts of the vehicle with one of the output shafts passing coaxially through the secondary shaft. This arrangement provides for a very compact transmission unit. The reversing unit can be set in one of three states in which respectively, the secondary and output shafts are arranged to rotate in the same sense, to rotate in opposite senses, and to be drivingly disengaged.

7 Claims, 4 Drawing Figures

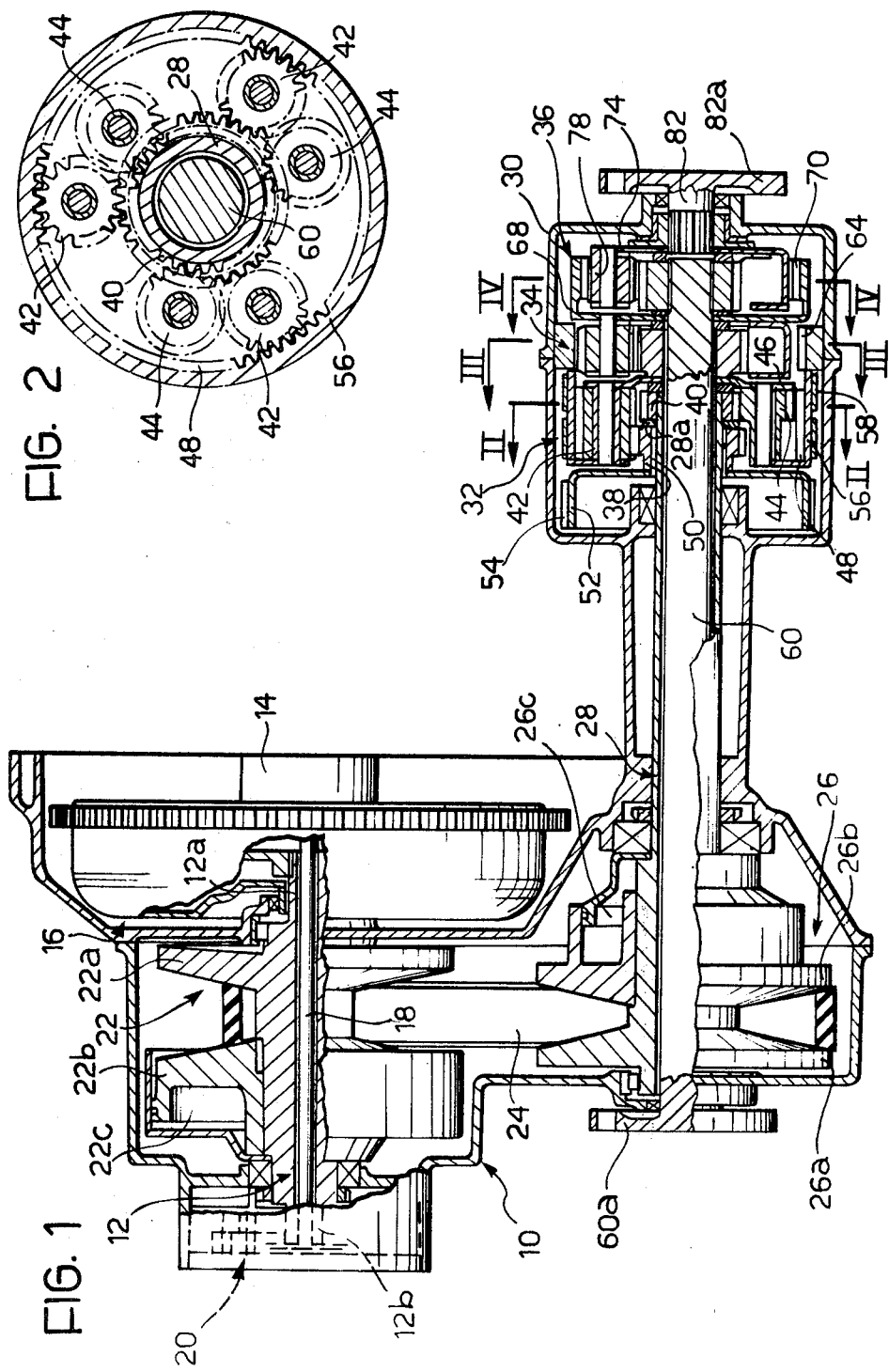

DRIVE TRANSMISSION UNIT INCORPORATING EXPANSIBLE-PULLEY STEPLESS SPEED CHANGER

BACKGROUND OF THE INVENTION

(1) Field of the Invention

The present invention relates to transmission units for transmitting drive from the engine of a motor vehicle to the half shafts of its driving wheels by means of an expansible-pulley stepless speed changer.

(2) Description of the Prior Art

Vehicle drive transmission units are known which incorporate expansible-pulley stepless speed changers comprising parallel primary and secondary shafts each mounting a respective expansible pulley fast for rotation therewith. Each pulley is composed of two facing frusto-conical discs one of which is rigid with its mounting shaft and the other of which can be moved axially therealong. A trapezoidal belt passes around the two pulleys and serves to transmit drive therebetween. The radius of engagement of the belt with each pulley depends on the position of the slidable pulley disc axially of its mounting shaft. By suitable adjustment of the axial positions of the slidable pulley discs, the transmission ratio between the pulleys can be varied. Axial displacement of each slidable disc is controlled hydraulically by controlling the flow of hydraulic fluid into and out of a chamber juxtaposed the disc.

The secondary shaft is used to drive a reduction gear box which in turn drives a differential unit connected to the two half shafts of the vehicle's driving wheels.

Since the expansible-pulley speed changer does not itself provide the option of drive reversal, it is generally necessary to provide transmission units incorporating such speeds changers with a selectively-operable reversing unit.

In the past, drive transmission units incorporating expansible-pulley speed changers and reversing units have been rather bulky. This feature represents an increasing drawback for this type of unit since, particularly in automobile engineering, there is a trend to smaller-sized vehicles.

Accordingly, it is an object of the present invention to provide a compact drive transmission unit which incorporates both an expansible-pulley stepless speed changer and a reversing unit.

SUMMARY OF THE INVENTION

In order to provide a compact transmission unit of the form indicated above, the reversing unit, reduction gear box and differential unit are, in accordance with the present invention, all epicyclic in form and are arranged in that order side by side coaxial with the secondary shaft. The reversing unit is driven from one end of the secondary shaft and serves to drive the reduction gear box which in turn drives the differential unit. The secondary shaft is made hollow and two coaxially-aligned output shafts connect the differential unit to the half shafts of the vehicle with one of the output shafts passing coaxially through the hollow secondary shaft. The reversing unit is selectively settable into one of three states in which respectively, the secondary and output shafts are arranged to rotate in the same sense, to rotate in opposite senses, and to be drivingly disengaged.

Due to the above arrangement, all the component members of the transmission unit are arranged about two axes only, these axes being parallel to one another; as a result the unit is extremely compact.

BRIEF DESCRIPTION OF THE DRAWINGS

A motor-vehicle drive transmission unit embodying the invention will now be particularly described, by way of example, with reference to the accompanying diagrammatic drawing, in which:

FIG. 1 is a part-sectional view of the transmission unit; and

FIGS. 2, 3 and 4 are sections, to an enlarged scale, on lines II—II, III—III, and IV—IV respectively of FIG. 1.

DESCRIPTION OF THE PREFERRED EMBODIMENT

Figure 3:
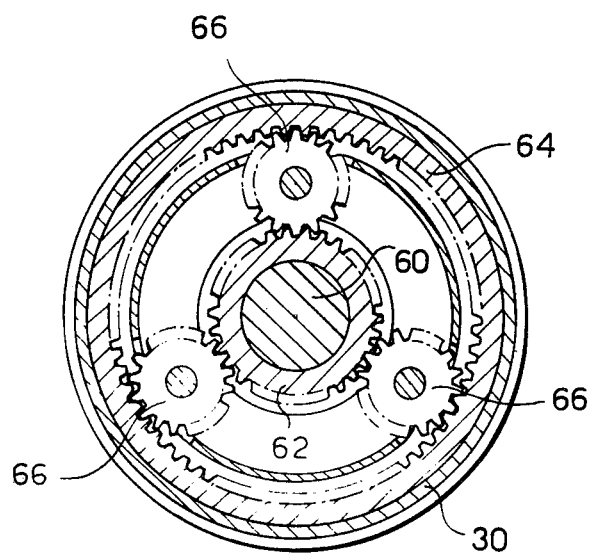

As shown in FIG. 1, the drive transmission unit comprises a fixed support structure 10 in the form of a casing within which parallel primary and secondary shafts 12 and 28 are rotatably mounted. One end 12a of the primary shaft 12 is connectable to a drive shaft 14 driven by the vehicle engine (not shown). The connection between the primary shaft 12 and the drive shaft 14 is effected by means of a fluid coupling 16, of type known per se, including a turbine to which the end 12a of the primary shaft is connected.

The primary shaft 12 is hollow and internally rotatably mounts a driving shaft 18 connected at one end to the drive shaft 14. At its opposite end the shaft 18 is connected to drive a rotary, external-gear, hydraulic pump 20 which coaxially surrounds the end 12b of the primary shaft 12 remote from the drive shaft 14.

A driving pulley 22 is mounted on the primary shaft 12 fast for rotation therewith. The driving pulley 22 comprises two facing frusto-conical discs 22a, 22b. The disc 22a is rigidly connected to the primary shaft 12 while the disc 22b is slidable axially along the shaft 12.

A driven pulley 26 is mounted on the secondary shaft 28 fast for rotation therewith and, like the driving pulley 22, comprises two facing frusto-conical discs 26a, 26b one of which (the disc 26a) is rigidly connected to the secondary shaft 28 while the other (disc 26b) is slidable axially of the shaft 28.

The driving pulley 22 is arranged to transmit rotation of the primary shaft 12 to the driven pulley 26 (and hence to the secondary shaft 28) by means of a trapezoidal belt 24.

The axial displacement of the discs 22b and 26b of the driving and driven pulleys 22 and 26 respectively is achieved hydraulically in a manner known per se, by introducing oil under pressure into the interiors of chambers 22c, 26c respectively located adjacent the slidable discs 22b and 26b. The pressurised oil is supplied from an hydraulic circuit comprising the rotary pump 20 and a regulation device (not shown). By appropriate axial displacement of the discs 22b and 26b, it is possible to inversely vary the operative diameters of the pulleys 22 and 26 (in terms of their engagement with the belt 24) thereby varying the transmission ratio between the primary shaft 12 and the secondary shaft 28.

The secondary shaft 28 is hollow and one end portion 28a of this shaft 28 extends into the interior of a casing 30 arranged on one side of the support structure 10. The casing 30 houses a selectively-operable reversing unit 32 a reduction gear box 34, and a differential unit 36 all of epicyclic form and arranged side by side coaxially with one another and with the secondary shaft 28. The reversing unit 32 as well as enabling reversal of the direction of drive rotation, also provides a gear reduction stage additional to that provided by a reduction gearbox.

As illustrated in FIGS. 1 and 2, the reversing unit 32 comprises a first and a second sun wheel 38, 40, two trios of planet wheels 42, 44, a planet carrier 46 rotatably mounting the planet wheels 42, 44 and an internally-toothed ring gear 48. The first sun wheel 38 is rotatably mounted by means of a bearing 50 on the end portion 28a of the secondary shaft 28. The end face of the sun wheel 38 nearest the pulley 26 is connected to a cylindrical bell 52 whose external cylindrical surface cooperates with a band brake 54 which is hydraulically controllable in a manner known per se. Application of the band brake 54 serves to secure the sun wheel 38 against rotation relative to the support structure 10. The second sun wheel 40 is positioned coaxially adjacent the first sun wheel 38 and is rigidly connected to the end 28a of the secondary shaft 28.

Each planet wheel 42 of one planet-wheel trio meshes with a corresponding planet wheel 44 from the other trio to form three meshing pairs of planet wheels. In addition, the planet wheels 42 of one trio mesh both with the first sun wheel 38 and with the ring gear 48, while the planet wheels 44 of the other trio mesh with the second sun wheel 40.

The internally toothed ring gear 48 coaxially surrounds the secondary shaft 28 and is fixed to the inner surface of an annular support element 56 upon whose outer surface act a pair of band brakes 58 hydraulically controlled in a manner known per se. Application of the band brakes 58 serves to secure the ring gear 48 against rotation relative to the support structure 10.

A first output shaft 60 extends coaxially through the interior of the hollow secondary shaft 28 and projects from both ends thereof. The output shaft 60 is rotatable relative to the secondary shaft 28. One projecting end portion of the first output shaft 60 lies within the casing 30 and extends coaxially through the planet carrier 46; the other projecting end portion of the shaft 60 lies outside the support structure 10 and is provided with a radial flange 60a by means of which the first output shaft 60 is connected to one of the half shafts of the vehicle (not shown).

On its side away from the sun wheels 38 and 40 of the reversing unit 32, the planet carrier 46 is rigidly connected to a further sun wheel 62 which is rotatably mounted on the first output shaft 60 and forms part of the reduction gear box 34. In addition to the sun wheel 62, the reduction gear box 34 comprises an internally-toothed ring gear 64 rigidly fixed to the casing 30 and coaxially surrounding the sun wheel 62, and a trio of planet wheels 66 equi-angularly spaced around the shaft 60 and each meshing both with the sun wheel 62 and the ring gear 64. The planet wheels 66 are rotatably supported on one side of a planet carrier 68 which coaxially surrounds the first output shaft 60; the other side of the planet carrier 68 carries an internally toothed ring gear 70 which forms part of the differential unit 36.

Figure 4:
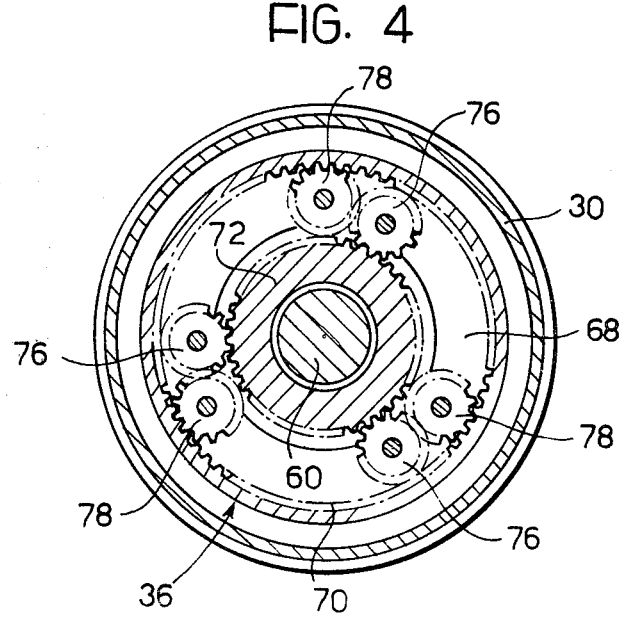

In addition to the ring gear 70, the differential unit 36 (FIG. 4) comprises a sun wheel 72 fast for rotation with the first output shaft 60, a planet carrier 74 fast for rotation with a second output shaft 82, and two trios of planet wheels 76 and 78 rotatably mounted on the planet carrier 74. Each planet wheel 76 from one trio meshes with a corresponding planet wheel 78 from the other trio to from three pairs of meshing planet wheels 76, 78. In addition the planet wheel trio 76 meshes with the sun wheel 72 while the planet wheel trio 78 meshes with the ring gear 70.

The second output shaft 82 is rotatably mounted by the casing 30 in coaxial alignment with the first output shaft 60. The shaft 82 projects through the casing 30 and is provided at its outer end with a radial flange 82a by means of which the second output shaft 82 is connected to the other half shaft of the vehicle. The inner ends of the first and second output shafts 60 and 82 are juxtaposed each other. It will be noted that the first output shaft 60 is of substantially greater length than the second output shaft 82.

In operation of the drive transmission unit, the rotation of the drive shaft 14 is transmitted from the primary shaft 12 to the secondary shaft 28 by the trapezoidal belt 24 which passes around the pulleys 22 and 26. The rotation of the secondary shaft 28 is then transmitted via the epicyclic reversing-reduction gear unit 32 and the reduction gear box 34 to the differential unit 36. This latter unit divides the drive from the engine drive shaft 14 between the first output shaft 60 connected to the sun wheel 72 and the second output shaft 82 connected to the ring gear 74.

The reversing unit 32 is selectively settable in one of three operating states by suitable control of the hydraulic control circuits of the band brakes 54 and 58, these three operating states being a first state in which the output shafts 60 and 82 rotate in the same sense as the secondary shaft 28, a second state in which the output shafts 60 and 82 rotate in the opposite sense to the secondary shaft 28, and a third state in which the output shafts 60 and 82 are drivingly disengaged from the secondary shaft 28. The first operating state is set by application of the band brake 54 to lock the first sun wheel 38 (the band brakes 58 being released), the second state is set by application of the band brakes 58 to lock the ring gear 48 (the band brake 54 being released), and the third state is set by release of both the band brake 54 and the band brakes 58.

From the foregoing it will be appreciated that the described transmission unit is particularly compact and of small overall size, since all the component members are disposed about only two parallel axes corresponding to the axes of the expansible-pulley speed changer.

I claim:

1. In a motor vehicle, a drive transmission unit adapted to be operatively interposed between the vehicle's engine and the half shafts of the vehicle's driving wheels, said unit incorporating an expansible-pulley stepless speed changer and comprising:

a support structure, a primary shaft rotatably mounted in said support structure and connectable at one end to the drive shaft from the engine of said vehicle, a hollow secondary shaft rotatably mounted in said support structure parallel to said primary shaft, two expansible pulleys respectively mounted fast for rotation on said primary and secondary shafts, each pulley comprising two facing frusto-conical discs one of which is rigidly connected to its respective mounting shaft and the other of which is axially slidable therealong, a trapezoidal belt passing around said pulleys at respective radii of engagement dependent on the position of the said slidable disc of the corresponding pulley axially of its mounting shaft, an hydraulic means operable to control the axial displacement of the said slidable disc of each pulley whereby to vary said radii of engagement and change the transmission ratio between said primary and secondary shafts, a selectively-operable epicyclic reversing unit coaxial with said secondary shaft and driven from one end thereof, the said reversing unit providing a stage of reduction gearing for the transmission unit, an epicyclic reduction gear box juxtaposed said reversing unit on one side thereof, the reduction gear box being coaxial with the reversing unit and being drivingly connected thereto, an epicyclic differential unit juxtaposed said reduction gear box on the side thereof away from the reversing unit, the differential unit being coaxial with the reduction gear box and being drivingly connected thereto, said differential unit including first and second rotatable output members, a first output shaft extending coaxially through said secondary shaft to project from both ends thereof, one projecting end of the first output shafts being connected to said first rotatable output member of the differential unit, and the other projecting end of the first output shaft being adaptable to drive one said half shaft of the vehicle, and a second output shaft rotatably supported by said support structure in coaxial alignment with said first output shaft, the second output shaft being connected to said second rotatable output member of the differential unit and being adaptable to drive the other said half shaft of the vehicle; said reversing unit being remotely selectively settable into one of three operating states in the first of which said output shafts are arranged to rotate in the same sense as said secondary shaft, in the second of which said output shafts are arranged to rotate in the opposite sense to said secondary shaft, and in the third of which said output shafts are drivingly disengaged from said secondary shaft.

2. A drive transmission unit according to claim 1, wherein said reversing unit, reduction gear box, and differential unit are arranged in a common casing.

3. A drive transmission unit according to claim 1 or claim 2, wherein said epicyclic reversing unit comprises:

a first sun wheel rotatably mounted on said secondary shaft, a second sun wheel mounted on said secondary shaft adjacent the first sun wheel and fast for rotation with said secondary shaft, an internally-toothed ring gear coaxially surrounding the said first and second sun wheels, a planet carrier mounted for rotation about said secondary shaft, a first and a second trio of planet wheels rotatably mounted on said planet carrier with each planet wheel of the first trio meshing with a corresponding planet wheel of the second trio, the planet wheels of the first trio also meshing with said first sun wheel and with said ring gear, and the planet wheels of the second trio also meshing with said second sun wheel, remotely-controllable means selectively operable to secure said first sun wheel against rotation relative to said support structure, and remotely-controllable means selectively operable to secure said ring gear against rotation relative to said support structure.

4. A drive transmission unit according to claim 3, wherein said epicyclic reduction gear box comprises:

a sun wheel rotatably mounted on said first output shaft and fast for rotation with the planet carrier of the reversing unit, an internally-toothed ring gear rigid with said support structure and coaxially surrounding the sun wheel of the reduction gear box, a planet carrier rotatably mounted on said first output shaft, and three planet wheels rotatably mounted on the planet carrier of the reduction gear box and equi-angularly spaced around said first output shaft, each planet wheel meshing with both the sun wheel and ring gear of the reduction gear box.

5. A drive transmission unit according to claim 4, wherein said epicyclic differential unit comprises:

a sun wheel fast for rotation with said first output shaft and constituting said first rotatable output member of the differential unit, an internally-toothed ring gear coaxially surrounding the sun wheel of the differential unit and fast for rotation with the planet carrier of the epicyclic reduction gear box, a planet carrier fast for rotation with the said second output shaft and constituting the said second rotatable output member of the differential unit, and a first and a second trio of planet wheels rotatably mounted on the planet carrier of the differential unit with each planet wheel from one trio meshing with a corresponding planet wheel from the other trio, the planet wheels of the first trio also meshing with the sun wheel of the differential unit and the planet wheels of the second trio also meshing with the ring gear of the differential unit.

6. A drive transmission unit according to claim 1, wherein said hydraulic means controlling displacement of said slidable pulley discs includes a mechanical pump arranged adjacent the end of the primary shaft remote from said drive shaft, said primary shaft being hollow and the transmission unit further including a pump-driving shaft connected at one end to the said drive shaft and extending through said primary shaft to drive said pump.

7. A drive transmission unit for a motor vehicle, said unit comprising:

a support structure, an expansible-pulley stepless speed changer including a primary shaft serving as an input shaft for said unit, and a hollow secondary shaft parallel to and driven from said primary shaft, said primary and seconday shafts being rotatably mounted by said support structure, a selectively-operable epicyclic reversing unit, an epicyclic reduction gear box, and an epicyclic differential unit arranged in that order side by side coaxial with the secondary shaft, the reversing unit being driven from one end of the secondary shaft and serving to drive the reduction gear box which in turn drives the differential unit, and a first and a second output shaft coaxially aligned with each other, each said output shaft being drivingly connected at one end to the differential unit and being connectable at its other end to a respective half shaft of said vehicle, one said output shaft extending coaxially through said hollow secondary shaft, said reversing unit being remotely selectively settable in one of three operating states in which, respectively, said output and secondary shafts are arranged to rotate in the same sense, to rotate in the opposing senses, and to be drivingly disengaged from each other.

* * * * *